United States Patent [19]

Aronowitz

[11] Patent Number: 5,076,694

[45] Date of Patent: Dec. 31, 1991

[54] IN-FLIGHT SCALE FACTOR CALIBRATION OF RING LASER GYRO SYSTEMS

[75] Inventor: Frederick Aronowitz, Laguna Niguel, Calif.

[73] Assignee: Rockwell International Corporation, El Segundo, Calif.

[21] Appl. No.: 653,555

[22] Filed: Feb. 11, 1991

[51] Int. Cl.$^5$ .............................................. G01C 19/66
[52] U.S. Cl. ..................................... 356/350; 372/94
[58] Field of Search ........................... 356/350; 372/94

[56] References Cited

U.S. PATENT DOCUMENTS

| | | |
|---|---|---|
| 3,581,227 | 5/1971 | Podgorski . |
| 3,649,931 | 3/1972 | Macek . |
| 3,937,578 | 2/1976 | Andringa . |
| 4,219,276 | 8/1980 | Dorsman . |
| 4,284,964 | 8/1981 | Maier, Jr. . |
| 4,634,283 | 1/1987 | Mark et al. .......................... 356/350 |
| 4,652,132 | 3/1987 | Nelson et al. . |
| 4,676,643 | 6/1987 | Vescial . |
| 4,740,085 | 4/1988 | Lim ..................................... 356/350 |
| 4,781,462 | 11/1988 | Ferriss et al. . |
| 5,012,081 | 4/1991 | Jungwirth et al. ................ 250/203.6 |

*Primary Examiner*—Samuel Turner
*Attorney, Agent, or Firm*—H. Fredrick Hamann; George A. Montanye; Tom Streeter

[57] ABSTRACT

In-flight scale factor calibration of a ring laser gyro is encumbered by the dependence of scale factor on light beam intensity and by the susceptibility of the intensity monitor to decalibration. The monitor may be calibrated in flight by modulating the mirror alignment, the laser current, or both to modulate the intensity. The intensity modulation produces a modulation of the scale factor. The ratio of the amplitude of scale factor modulation to the amplitude of the measured intensity modulation should be the same in-flight as during factory calibration. If it is not, the intensity monitor is calibrated by multiplying its output by the change in the ratio, and the calibrated intensity measurement rather than the raw intensity measurement is used to determine the scale factor.

12 Claims, 2 Drawing Sheets

IN-FLIGHT SCALE FACTOR CALIBRATION OF RING LASER GYRO SYSTEMS

BACKGROUND OF THE INVENTION

The present invention relates to ring laser gyroscopes and has particular relation to methods for calibrating the scale factor for same.

A ring laser gyroscope or ring laser gyro (RLG) is suppose to determine through what angle the apparatus to which it is attached, such as an intercontinental ballistic missile (ICBM). has rotated. What it actually determines is how many interference fringes it has detected. A scale factor must be calculated which, when multiplied by the number of fringes, gives the angle of rotation. This scale factor is unique for each ring laser gyro, and is calculated empirically by rotating the gyro through a known angle and counting the number of fringes which are detected. It may also be calculated by rotating the RLG at a known rate of rotation and measuring the fringe rate (number of fringes per second). Measuring the "scale factor," therefore, as that term is used herein, is synonymous with measuring the angle, number of fringes, rate of rotation, or fringe rate, as appropriate for the context, and these terms are synonymous with one another.

Unfortunately, an RLG's scale factor changes with time. It is also subject to being changed by the radiation pulse produced by the nearby detonation of a nuclear device. It is therefore important that an RLG in an ICBM be able to be calibrated after the ICBM has survived a first strike Needless to say, it is impractical, at that time, to remove the RLG from the missile, factory calibrate it, and replace it in the missile before a launch.

In general, the scale factor is a function of the intensity of the beam, which may be measured by a suitable intensity monitor. While a stable intensity is desirable, the actual intensity (after aging, radiation pulse, or the like) is all that is required to calculate the actual scale factor. Accordingly, the output voltage from the intensity monitor is fed to a suitable scale factor calculator, and the appropriate compensation is made. Unfortunately, the same aging or radiation pulse which changes the scale factor will also affect the intensity monitor. While the monitor will still produce an output voltage which is proportional to intensity, the proportionality constant (volts of output signal per watt of beam intensity) will be changed by the pulse. A false compensation will therefore be provided. This invention provides an approach to an in-flight calibration of the intensity monitor so that the correct compensation can be made to the scale factor.

A calibration opportunity exists between the end of the boost phase and the beginning of the reentry phase. During this post-boost phase, the missile is spinning rapidly, much like a bullet, but is too far above the earth's surface to be intercepted or even effectively interfered with. The conventional method for calibrating the RLG during this post-boost phase is to determine the actual rotation angle by sensing the sun, a star, or a radio source on the earth, and to compare the actual angle with the calculated angle. The scale factor may be determined from this comparison. The present invention avoids such external input, and calculates the scale factor in an entirely self-contained fashion by first calculating the correct calibration coefficient for the intensity monitor and then applying the corrected output voltage from the intensity monitor to the scale factor calculator.

SUMMARY OF THE INVENTION

A ring laser gyro typically consists of three or four tubes bored in a single block of glass. These tubes form a triangle or square. A mirror is placed at each vertex, and the tubes are filled with a helium neon mixture. One of the legs of the square or triangle includes a cathode at the center and an anode at each end. The electric current passing from the cathode to both anodes creates a discharge, which in turn creates a beam of light, which propagates in both directions around the RLG, and quickly settles into a lasing mode. The optical path of the RLG is an integral multiple of the wavelength of the light.

The mirror at one of the vertices of the RLG is an alignment mirror, and is actively aligned. One or more piezoelectric transducers (PZTs) are put on the rear surface of the mirror to align it. When the mirror is directly aligned, the laser's intensity will be at a maximum; misalignment causes a drop off from this maximum The PZTs are therefore dithered to keep the intensity at its maximum.

Two anodes are used rather than one, so that ions flowing from the cathode to the first will flow in the direction opposite to the ions flowing from the cathode to the second. The effect of the fluid of ions on the speed of light through the lasing leg of the RLG is thus eliminated. The current is actively stabilized so that exactly an equal value flows to each anode. Within these limitations, any suitable current may be used, and beam intensity increases with current.

As noted above, the scale factor of the RLG is a function of the intensity of the beam, which in turn is a function both of how well the alignment mirror is aligned and of how much current flows from the cathode to the two anodes. The intensity of the beam may be modulated by modulating either or both of these factors, and the resultant modulation of the scale factor may be used to determine the true scale factor.

In one embodiment of the present invention, the intensity of the laser is modulated by modulating the alignment mirror. A sine wave of voltage is superposed onto the voltage feedback loop which maintains alignment. This results in a sine wave of beam intensity, at twice the drive frequency, which results in a sine wave of scale factor. (It also results in a sine wave in the intensity monitor output voltage, the significance of which is discussed in greater detail below.) The sine wave of scale factor may readily be determined from the sine wave in fringe rate (fringes per second), since the ICBM is rotating at a constant speed. As pointed out above, it is the constancy of this speed, even though its magnitude is unknown, which provides the calibration opportunity.

During factory calibration, it is easy to determine the ratio of the amplitude of the scale factor sine wave to the amplitude of the intensity monitor output voltage sine wave. This ratio is subject to change with age and radiation pulse. If this ratio, as measured in flight, differs from the ratio, as measured during factory calibration, then this difference indicates that the intensity monitor's proportionality constant (watts of beam intensity per volt of monitor output signal) has been changed by age or by the radiation pulse. It further indicates the percentage change in the monitor's proportionality constant, for the percentage change in the monitor's proportionality constant is the same as the percentage change in the ratio. The voltage from the intensity monitor is therefore amplified (or multiplied if digital) accordingly before being fed to the scale factor calibration apparatus.

The second embodiment of the present invention can, for example, modulate the laser discharge current with a square wave instead of modulating the mirror alignment. The same resulting square wave in intensity is noted, and the same adjustment is made to the intensity monitor output voltage before it is fed to the scale factor calibration apparatus. The third embodiment of the present invention modulates both the laser discharge current and the mirror alignment. Operation is as in the first and second embodiments.

The present invention takes advantage of the fact that, during the post boost phase, the rocket's rotation is constant, although initially unknown. By observing deviations from constancy in the apparent rotation of the rocket, induced by perturbations in the intensity of the laser light due to mirror alignment modulations and laser discharge current modulations, the actual scale factor under which the missile has been operating under since it was launched may be determined. A constant rocket rotation makes it easy to detect the fringes-per-second modulation from the underlying constant fringes-per-second signal produced by the rotation. To the extent, however, that this modulation can be extracted from a more complex underlying signal, the rocket's rotation may be correspondingly more complex without undue loss of accuracy. The benefits gained by updating the calibration of the scale factor before the rocket enters its re-entry phase may well outweigh any minor loss of accuracy due to the modulation. Indeed, there may not be any well defined re-entry phase, such as when the present invention is used in a missile which is guided all the way to its target The present invention is best suited for use during flight. However, it may be used on the ground or in any other situation in which the accuracy of the intensity monitor is suspect and in which it is inconvenient or impossible to calibrate the RLG by rotating it through a known angle and measuring the resulting number of fringes. The term "in-flight" should be construed accordingly.

DETAILED DESCRIPTION OF A PREFERRED EMBODIMENT

Figure 1:
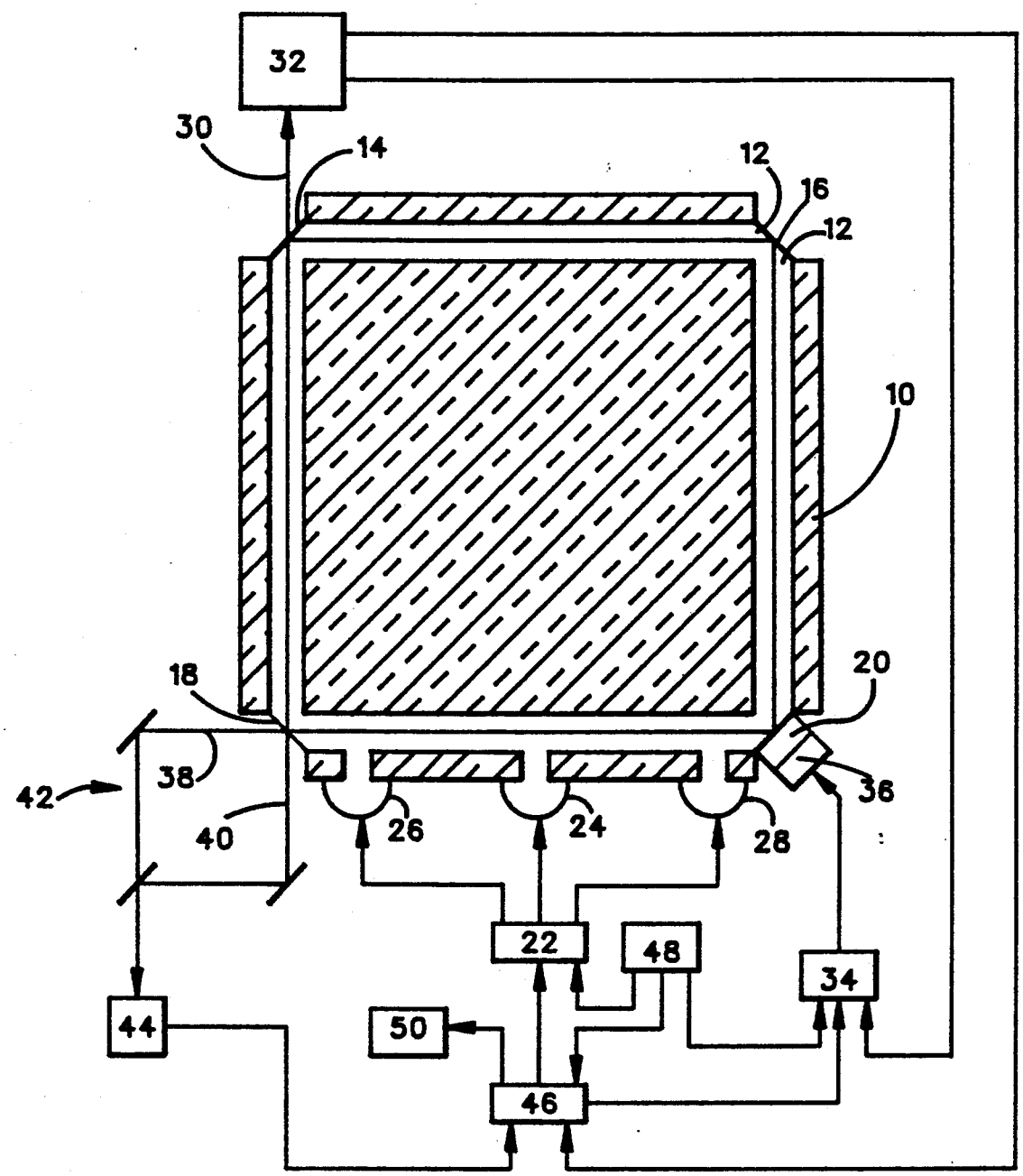
FIG. 1 is a simplified cross-sectional representation of a ring laser gyro and associated control apparatus.

In FIG. 1, a ring laser gyro comprises a block of glass 10 with a plurality of tubes 12 bored in it. The block 10 is bounded at its corners by mirrors 14, 16, 18, and 20. A current controller 22 produces a current which enters the tubes 12 at a cathode 24, and leaves at anodes 26 and 28. Mirror 14 is partially transmissive, allowing light 30 to fall on an intensity monitor 32, which sends an intensity signal to an alignment controller 34, which in turn controls a PZT 36 on the back of mirror 20, an alignment mirror, thereby actively aligning the alignment mirror 20 so as to maximize the intensity of the light beam 30.

Mirror 18 is also partially transmissive, allowing clockwise-propagating light 38 and counterclockwise-propagating light 40 to pass through it and interfere with each other in an interferometer 42, the fringes from which fall on a fringe detector 44. The fringe detector 44 and the intensity monitor 32 send their output signals to a comparator 46. The comparator 46 also receives signals from a modulator 48, such as a sine or square wave generator, using the signals from the modulator 48 to detect any modulation in the signals it receives from the intensity monitor 32 and the fringe detector 44. Such signals are detected because the modulator 48 also modulates the current controller 22 or the alignment controller 34 or both such controllers, thereby impressing a modulation on the light beam intensity, which in turn causes a modulation of the fringe rate.

The comparator 46 then sends a signal to a scale factor calculator 50. This signal is an emulation of the signal which is produced by the intensity monitor 32 when it has not been damaged since calibration, or, when the intensity monitor 32 has been damaged, the signal which would have been produced if it had not been damaged. It is produced by multiplying together three factors. The first factor is the signal received by the comparator 46 from the intensity monitor 32. The second factor is a ratio, the numerator of which is the amplitude of the modulation of the fringe rate signal received from the fringe detector 44 (which is proportional to the modulation of the scale factor), and the denominator of which is the amplitude of the modulation of the intensity signal received from the intensity monitor 32. This second factor is determined in-flight, and may be periodically redetermined as often as necessary or convenient.

The third factor is a ratio, the denominator of which is the amplitude of the modulation of the fringe rate signal received from the fringe detector 44 (which is proportional to the amplitude of the modulation of the scale factor), and the numerator of which is the amplitude of the modulation of the intensity signal received from the intensity monitor 32. This third factor is determined during factory calibration rather than in-flight, and does not change during flight. It may be conveniently stored in, for example, an EEPROM.

Thus, as long as the intensity monitor 32 is operating in its factory calibrated condition, multiplying together the second and third factors results in them canceling each other out. When the intensity monitor suffers sufficient damage as to deviate from its factory calibrated condition, the second factor will counteract the deviation while the third factor normalizes the output signal. This process may be viewed as outputting a product of two factors. It may be viewed equally accurately as outputting a quotient, the dividend of which is the amplitude ratio in-flight, and the divisor of which is the amplitude ratio established during factory calibration.

The signal thus sent to the scale factor calculator 50 may be viewed as a calibrated intensity monitor output signal. Its production may be viewed as a combination of factory calibration and in-flight calibration. Factory calibration is a four part process: impose a modulation on the intensity of the light beam; determine the amplitude of the resultant modulation of the raw intensity monitor output signal; determine the amplitude of the resultant modulation of the scale factor; and determine the ratio of the output signal amplitude to the scale factor amplitude. In-flight calibration is also a four-part process: repeat (in-flight) the steps of factory calibration to get an in-flight amplitude ratio; determine the quotient of the factory calibration ratio to the in-flight ratio; calculate a calibrated intensity monitor output signal by multiplying the raw intensity monitor output by this quotient of ratios; and direct this calibrated intensity monitor output signal to the scale factor calculator. This multiplication, and this ratio and quotient determination, may be done digitally if the signals involved are digital, or by suitable amplifiers and attenuators if the signals involved are analog.

If the intensity monitor 32 is unaffected by age or radiation pulse after factory calibration, the signal produced by the comparator 46 will be the same as that produced by the intensity monitor 32. If the intensity monitor 32 is thus affected, however, the signal received by the scale factor calculator 50 from the comparator 46 will be the signal which would have been produced by the intensity monitor 32 if it had not been affected. No modification of the scale factor calculator 50 is therefore required. This is an important advantage of the present invention.

Figure 2:
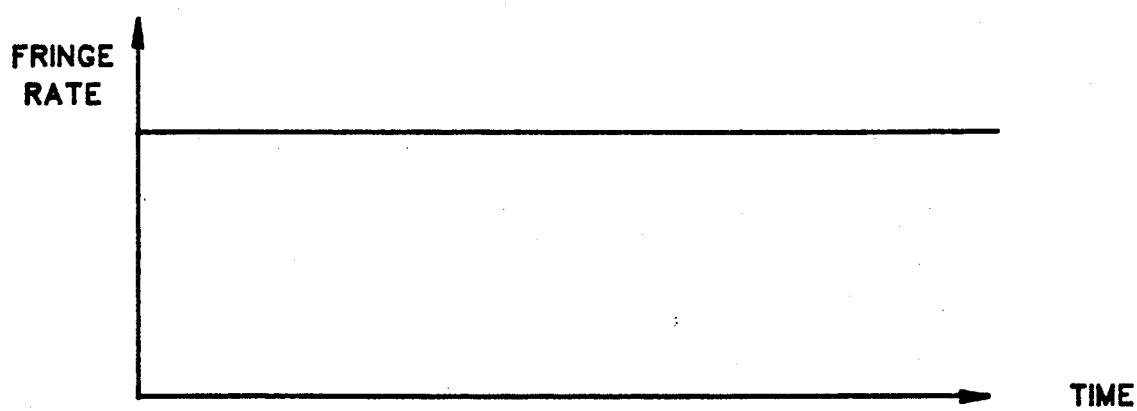
FIG. 2 is a graph showing the constancy of the unmodulated fringe rate during the post-boost phase.
Figure 3:
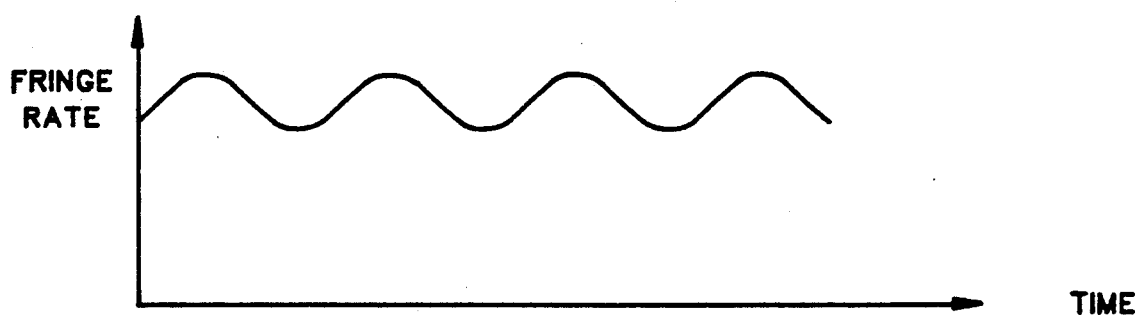
FIG. 3 is a graph showing the sine wave modulation fringe rate, superimposed on the constant fringe rate of the post-boost phase, resulting when the beam intensity is sine wave modulated.

In FIG. 2, the fringe rate is shown as constant over time, since the ICBM in its post-boost phase rotates at a constant, although initially unknown, speed. A modulation in light beam intensity, using any of the foregoing methods, will produce a modulation in fringe rate, such as the one shown in FIG. 3. The simple background shown in FIG. 2 makes it relatively straightforward to extract the modulated wave from the background and measure its amplitude.

Figure 4:
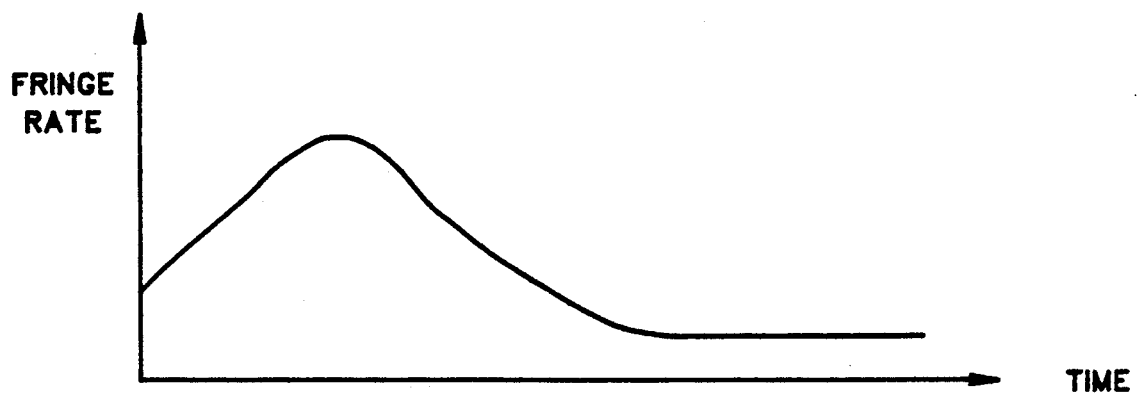
FIG. 4 is a graph showing the variability of the unmodulated fringe rate during the boost phase.
Figure 5:
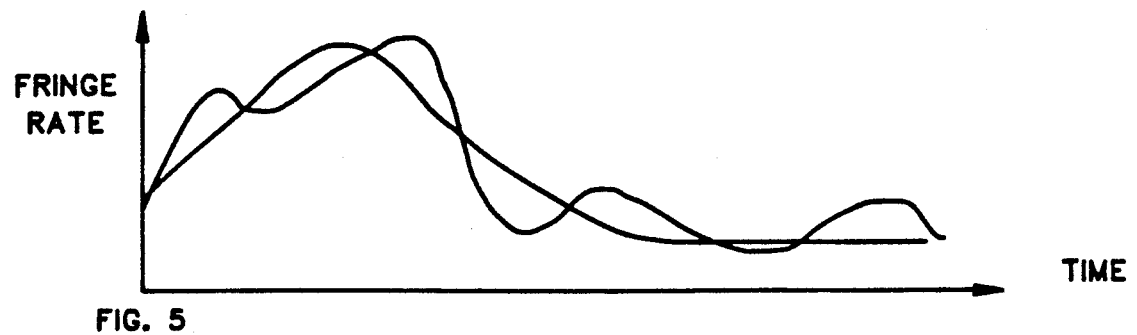
FIG. 5 is a graph showing the sine wave modulation of the fringe rate, superimposed on the variable fringe rate of the boost phase, resulting when the beam intensity is sine wave modulated.

FIG. 4 shows a more complex comparison between fringe rate and time, exemplary of the boost phase or, indeed, of any phase in which the RLG is undergoing rotational acceleration. In this situation, a modulated wave in light beam intensity, using any of the foregoing methods, will produce in the fringe rate the superposed mixture of background and modulated wave shown in FIG. 5. If sufficient signal analysis capabilities are available to extract the modulated wave from the more complex background, then in-flight scale factor calibration may take place during correspondingly more complex acceleration of the ICBM. If in-flight scale factor calibration may safely be deferred until the post-boost phase, then signal analysis requirements may be scaled back accordingly.

To a first approximation, the scale factor is related to intensity as a linear function, and the foregoing description of proportional multiplication reflects this approximation of linearity. If greater accuracy is required, the scale factor can be factory calibrated by imposing the light beam intensity modulation on a plurality of underlying beam intensities and calculating the scale factor separately at each data point. The linearity approximation can then be relegated to interpolation between data points.

A related approximation is that the scale factor correlates only (or best) with the underlying intensity. It may be discovered, an the particular RLG under consideration, that the scale factor measured during factory calibration correlates best with a linear combination of the output of the intensity monitor, the laser discharge current, the voltage which is applied to the alignment mirror (or mirrors), and the amplitude, phase, and frequency of the modulation impressed on each of these parameters. In this situation, the phrase "intensity monitor output signal" should be construed as meaning this linear combination or any convenient sub-combination thereof.

Even greater accuracy can be obtained by combining the techniques described in the preceding two paragraphs. Each parameter may be systematically varied independently of the others, and the linearity approximation may be relegated to only the region between the data points of this three dimensional data grid. Even if insufficient data processing power is available to make this calculation in-flight, the respective linearity coefficients for the most likely operating region can be used to calculate how much intensity modulation there should be, and how much of it should come from modulating the laser discharge current as compared with modulating the voltage applied to the PZT or PZTs) on the back of the alignment mirror. Temperature compensation, according to any convenient method (which may be entirely conventional) may be conveniently applied at this point.

Square and sine wave modulation have been shown and are preferred, but ramp, triangle, or other wave forms may be used if desired. Other modifications of the embodiments described herein will be apparent to those having skill in the art, without going beyond the true scope and spirit of the present invention.

Industrial Applicability

The present invention is capable of exploitation in industry, and can be used, whenever scale factor calibration of an RLG is desired and external inputs are undesired. It can be made from components which, separately considered apart from one another, are entirely conventional, or it can be made from their nonconventional counterparts.

While particular embodiments of the present invention have been described in detail, the true scope and spirit of the present invention is not limited thereto, but are limited only by the following claims.

What is claimed is:

1. A method for in-flight a calibrating the scale factor of a ring laser gyro (RLG), the RLG including a monitor which monitors an intensity of a light beam propagating within the RLG, and the monitor directing an intensity monitor output signal to a scale factor calculator, the method comprising:
   (a) imposing a modulation on the intensity of the light beam;
   (b) determining an amplitude of a resultant modulation of a raw intensity monitor output signal;
   (c) determining an amplitude of a resultant modulation of the scale factor;
   (d) determining the ratio of the amplitude determined in step (b) to the amplitude determined in step (c);
   (e) repeating steps (a) through (d) in-flight;
   (f) determining the quotient of the ratio determined in step (d) to the ratio determined in step (e);
   (g) calculating a calibrated intensity monitor output signal by multiplying the raw intensity monitor output by the quotient determined in step (f); and
   (h) directing the calibrated intensity monitor output signal to the scale factor calculator.

2. The method of claim 1 wherein the modulation on the intensity of the light beam is imposed successively on a plurality of underlying beam intensities.

3. The method of claim 1 wherein the step of determining the amplitude of the resultant modulation of the scale factor includes the step of determining the amplitude of the resultant modulation of the fringe rate.

4. The method of claim 1 wherein the step of imposing the modulation on the intensity of the light beam includes the step of imposing a modulation on the laser discharge current.

5. The method of claim 1 wherein the step of imposing the modulation on the intensity of the light beam includes the step of imposing a modulation on the mirror alignment.

6. The method of claim 5 wherein the step of imposing the modulation on the intensity of the light beam includes the step of imposing a modulation on the laser discharge current.

7. Apparatus for in-flight calibrating the scale factor of a ring laser gyro (RLG), the RLG including a monitor which monitors an intensity of a light beam propagating within the RLG, and the monitor directing an intensity monitor output signal to a scale factor calculator, the apparatus comprising:

(a) means for imposing a modulation on the intensity of the light beam;

(b) means for determining an amplitude of a resultant modulation of a raw intensity monitor output signal;

(c) means for determining an amplitude of a resultant modulation of the scale factor;

(d) means for determining the ratio of the amplitude described in element (b) to the amplitude described in element (c);

(e) means for repeating the operation of the means described in elements (a) through (d) in-flight;

(f) means for determining the quotient of the ratio described in element (d) to the ratio determined in element (e);

(g) means for calculating a calibrated intensity monitor output signal by multiplying the raw intensity monitor output by the quotient described in element (f); and (h) means for directing the calibrated intensity monitor output signal to the scale factor calculator.

8. The apparatus of claim 7 wherein the means for imposing a modulation on the intensity of the light beam includes means for imposing the modulation successively on a plurality of underlying beam intensities.

9. The apparatus of claim 7 wherein the means for determining the amplitude of the resultant modulation of the scale factor includes means for determining the amplitude of the resultant modulation of the fringe rate.

10. The apparatus of claim 7 wherein the means for imposing the modulation on the intensity of the light beam includes means for imposing a modulation on the laser discharge current.

11. The apparatus of claim 7 wherein the means for imposing the modulation on the intensity of the light beam includes means for imposing a modulation on the mirror alignment.

12. The apparatus of claim 11 wherein the means for imposing the modulation on the intensity of the light beam includes means for imposing a modulation on the laser discharge current.

* * * * *